United States Patent [19]

Roberson, Sr.

[11] 4,431,133

[45] Feb. 14, 1984

[54] THERMOSTAT MOUNTING ASSEMBLY

[76] Inventor: Walter H. Roberson, Sr., 808 Second St., Altamonte Springs, Fla. 32701

[21] Appl. No.: 292,301

[22] Filed: Aug. 12, 1981

[51] Int. Cl.³ ............................................. F01P 7/02
[52] U.S. Cl. ................................... 236/345; 137/522; 236/93 A
[58] Field of Search ............. 236/34, 34.5, 100, 93 A; 137/522, 523

[56] References Cited

U.S. PATENT DOCUMENTS

| | | | |
|---|---|---|---|
| 1,873,769 | 8/1932 | Lang | 236/34.5 X |
| 2,075,521 | 3/1937 | Hild | 236/34.5 X |
| 2,695,012 | 11/1954 | Brubaker | 236/34 X |
| 2,750,117 | 6/1956 | Pascolini | 236/34 |
| 2,833,478 | 5/1958 | Middleton | 236/34.5 X |
| 3,136,337 | 6/1964 | Fox | 236/34.5 X |
| 3,313,483 | 4/1967 | Mallinger | 236/34.5 |
| 3,529,770 | 9/1970 | Moody | 236/100 |
| 3,662,949 | 5/1972 | McIntosh et al. | 137/522 X |
| 4,013,218 | 3/1977 | King | 236/34.5 |

Primary Examiner—William E. Tapolcai
Attorney, Agent, or Firm—Neil F. Markva

[57] ABSTRACT

The thermostat mounting assembly is used to support a thermostat at a location between an engine block and a radiator. The housing has a fluid inlet port and a fluid outlet port with a support assembly used to rigidly fix the thermostat in place within the housing. A manually operable mechanism is connected to the housing to effect a continuous flow of coolant liquid to by-pass the position of the thermostat between the engine block and the radiator.

9 Claims, 16 Drawing Figures

THERMOSTAT MOUNTING ASSEMBLY

FIELD OF THE INVENTION

The present invention relates to a mounting assembly used to mount a thermostat between an engine block and the radiator. More particularly, the invention relates to a mounting assembly with which conventional thermostats may be mounted and a means is provided to establish a continuous flow of coolant fluid between the engine block and the radiator of an internal combustion engine when it is desired to by-pass the thermostat.

BACKGROUND OF THE INVENTION

A thermostat assembly is removably mounted in the engine block of every internal combustion engine. The well known conventional thermostat assemblies include a thermostatic element, a valve element, a valve seat and a biasing means to urge the valve element against the valve seat. The typical prior art thermostat assembly is shown in U.S. Pat. No. 3,153,933. Here, the thermostatic element contains a heat expandable material which expands when the temperature of the surrounding liquid exceeds a predetermined temperature. When the expansion of the thermostatic material in the thermostatic element takes place, the valve element is forced away from the valve seat.

Normally, when the surrounding liquid temperature falls below a preset value, the valve element is biased against the seat. This prior art thermostat assembly operates automatically with changing temperatures taking place in the surrounding coolant liquid. However, there are times when these thermostats fail to operate causing the valve element to stick in place to the valve seat. When this happens, the flow of coolant liquid is interrupted between the engine block and the radiator and causes overheating. Extensive damage is known to occur to the internal combustion engine under such overheating conditions.

This basic problem has been well recognized by the prior art and their have been several attempts to overcome this type of thermostat failure. Such prior art structures have been very complicated, costly and unable to satisfactorily meet the existing need. U.S. Pat. No. 3,776,457 discloses the use of a rubber or heat softenable material which softens when the temperature of the liquid exceeds a predetermined value. This type of structure is not easily controlled since it depends upon the temperature sensitivity of the chemical constituents in the plug material.

The U.S. Pat. No. 2,695,012 discloses an adjustable thermostat having a fairly complex structural configuration. The purpose of this prior art thermostat assembly is to establish a temperature differential between the lower and upper parts of the engine block. It is not possible to open the valve element permanently or to manually manipulate the thermostatic valve to provide a continuous flow of coolant liquid which will by-pass the thermostat completely.

The U.S. Pat. Nos. 2,833,478 and 2,750,117 disclose a thermostat assembly having a remote control capability. The control devices are located on the dashboard of the vehicle with the thermostat being placed in the normal location within the engine block. The complex nature of the assembly requires skilled personnel to install and maintain the effectiveness of the system.

PURPOSE OF THE INVENTION

The primary object of the invention is to provide a thermostat mounting assembly which is simple in construction, easy to install and easy to operate by any person when it is desired to by-pass the thermostat assembly in the cooling system of a vehicle.

Another object of the invention is to provide a thermostat mounting assembly wherein a conventional thermostat may be mounted and disposed in a more favorable location between the engine block of an internal combustion engine and the radiator.

A still further object of the invention is to provide a thermostat mounting assembly wherein a handle means is located immediately adjacent a housing so that the thermostat may be by-passed with a continuous flow of coolant liquid in the event that the vehicle is under heavy load thereby requiring a full or complete continuous flow of coolant fluid or to simply obtain a continuous coolant liquid flow which by-passes a thermostat which may have failed to operate automatically when the vehicle is under normal operation.

SUMMARY OF THE INVENTION

The thermostat mounting assembly as disclosed and described herein comprises a housing having a fluid inlet port and a fluid outlet port. Support means are located in the housing for rigidly fixing the thermostat in place. Manually operable means are connected to the housing to effect a continuous flow of the coolent liquid by-passing the thermostat between the engine block and the radiator.

The support means includes a carrier section having a structural configuration to rigidly fix a thermostat in place between the inlet and outlet ports. It is particularly important when the carrier section is designed to hold a conventional type of thermostat which is normally placed in the engine block of an internal combustion engine.

The manually operable means has a structural configuration effective to be externally manipulated immediately adjacent the housing. Upon manipulation of the manually operable means, a continuous, coolant liquid flow is established to by-pass the thermostat which is rigidly fixed on the carrier section.

One feature of the invention is the use of handle means mounted on one external end of a shaft member extending through the housing with the other end of the shaft member being inside the housing. Engagement means includes a brace means mounted to the inside end of the shaft member and having a structural configuration to contact the thermostat held in place on the carrier section.

Another feature of the invention is directed to an embodiment of the carrier section which is movably disposed within the housing between a closed position and an open by-pass position upon manipulation of the handle means. Movement of the carrier section to an open position is effective to establish a continuous flow of coolant fluid through the inlet and outlet ports between the inside of the housing and the outside of the carrier section disposed inside the housing. Different embodiments show various ways of establishing the structural configuration of a carrier section within a housing.

In another embodiment, a housing includes an outer casing and a tubular section having an open end surface, a closed end surface and a side wall. The inlet and outlet ports extend from the side wall and fluid communication with the tubular section. The carrier section includes a cylindrical shell having openings located on opposed sides of the support means located therein. In other words, the support means rigidly fix a thermostat at a location between the openings in the cylindrical shell. The cylindrical shell extends outwardly from the open end surface of the tubular section and is movable from a first normal operational position to a by-pass position. In the first normal operation position, the openings in the cylindrical shell align with the inlet and outlet ports to direct the flow of coolant fluid to direct the flow of coolant fluid through the thermostat. In the second by-pass position, the closed end surface of the tubular section is spaced from the outside of the cylindrical shell to direct a continuous coolant liquid flow therebetween around the cylindrical shell.

Another embodiment comprises a housing having a spherical casing section located between the inlet and outlet ports. Support means includes a thermostat holding frame means mounted in a spherical shell which is movably mounted within the casing section. A first and second set of openings are located in the spherical shell on opposed sides of the frame means and the openings are disposed at two separate positions of the movable shell within the casing section. Under normal thermostat operations, the first set of openings is aligned with the inlet and outlet ports. If it is desired to allow or establish a continuous, by-pass coolant liquid flow, the shell is moved to a second position to move the thermostat out of the way of flow when the coolant liquid moves through the second set of openings.

In more general terms, the thermostat mounting assembly of this invention includes a housing having an inlet section and an outlet section. The inlet section includes the inlet port and defines a first chamber on one side of the thermostat support means. The outlet section includes the outlet port and defines a second chamber on the opposed side of the thermostat support means. The inlet section has a by-pass opening and the outlet section has a by-pass opening. Manually operable valve means are disposed to open and close the flow of coolant liquid through the by-pass openings. Support means may be fixedly located in either one of the first or second chambers. A fixed wall member may include a by-pass opening and is disposed on one of the inlet or outlet sections between the first and second chambers. In this particular instance the inlet and outlet sections are stationary and define stationary chambers therein. Handle means are disposed immediately adjacent the outside of the housing and are manipulatable from outside the housing to easily operate the valve means for opening and closing the by-pass opening. In one embodiment, the by-pass openings are disposed contiguously with respect to each other and are aligned with the valve means being located on one side thereof. In another embodiment, the valve means is disposed between the by-pass openings located in the inlet and outlet sections.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figures 1, 4:
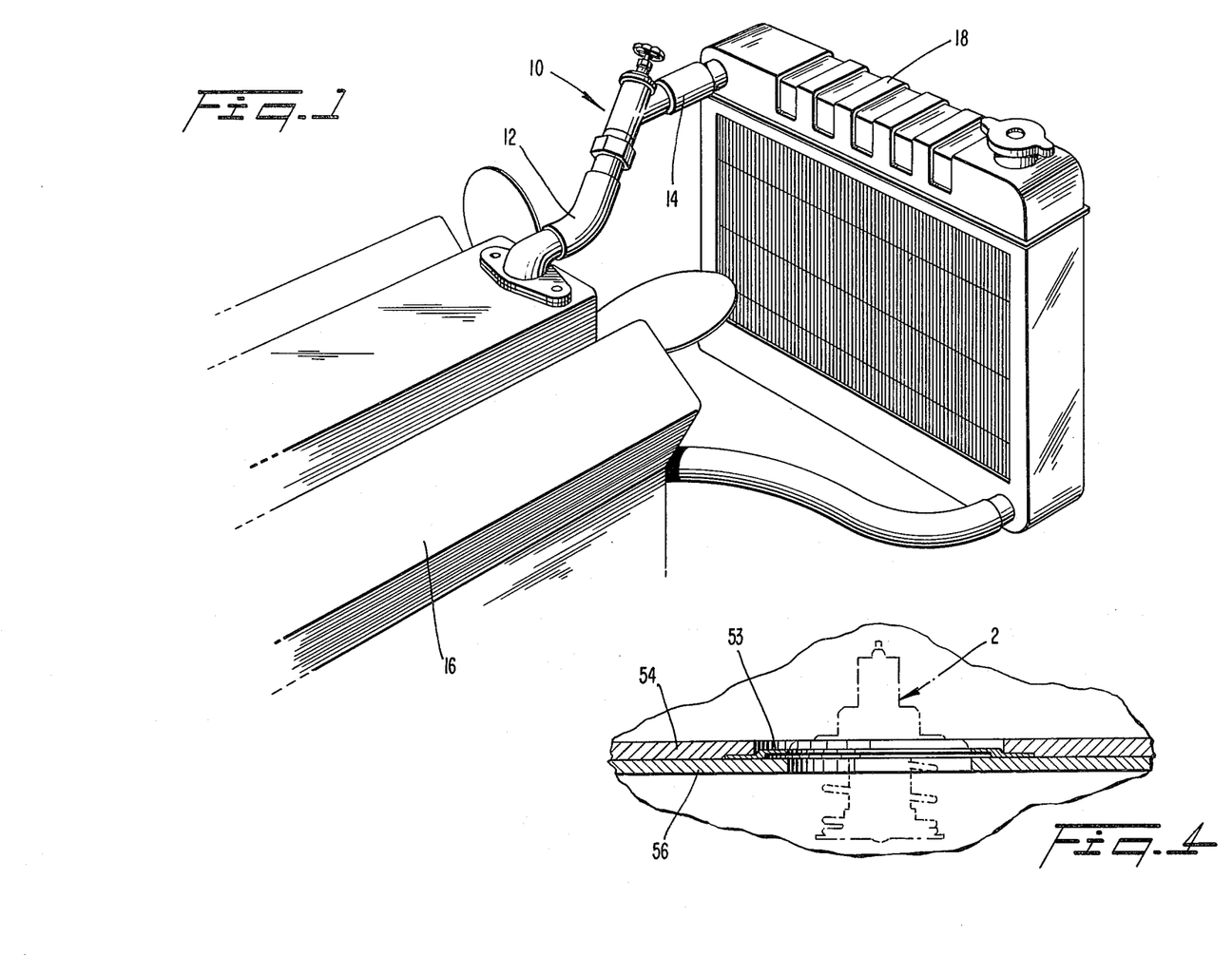
FIG. 1 is a perspective view of a thermostat holding assembly made in accordance with this invention as it is placed between an engine block and a radiator.
FIG. 4 is a detailed drawing showing a means for adapting the support means of the invention to handle various size thermostats within the thermostat mounting assembly made in accordance with this invention.
Figures 2, 2A, 3:
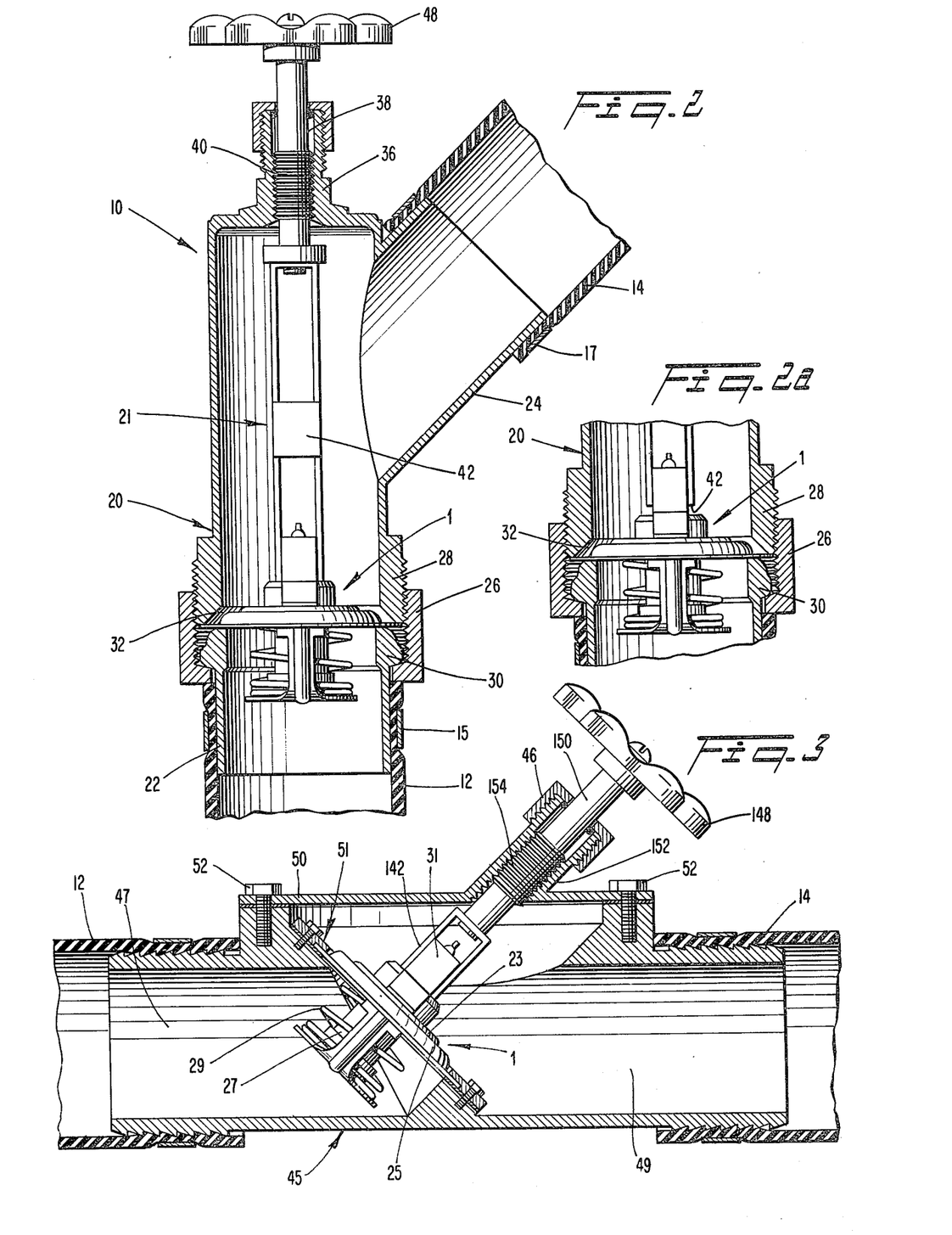
FIG. 2 is a longitudinal sectional view of an embodiment of the thermostat mounting assembly as shown in FIG. 1.
FIG. 2a is fragmentary sectional view of the assembly as shown in FIG. 2 with the thermostat in an open position during normal operation.
FIG. 3 is a longitudinal sectional view of another embodiment made in accordance with this invention.

The thermostat mounting assembly, generally designated 10, includes a housing 20 with an inlet port 22 located on an inlet section and a fluid outlet port 24 on an outlet section. The inlet section defines a first stationary chamber and the outlet section defines a second stationary chamber. Hose 12 connects the fluid inlet port to the engine block and hose 14 connects the fluid outlet port to the radiator. Hose clamps 15 and 17 hold the hoses 12 and 14, respectively, in place.

As shown, the mounting assembly 10 is easily installed by simply cutting the existing radiator hose extending between the engine block and the radiator and inserting the appropriate fluid inlet port 22 and fluid outlet port 24 as discussed above.

A standard or conventional thermostat, generally designated 1, is mounted between the inlet and outlet ports 22 and 24. Thermostat 1 includes a thermostatic element 27, a valve element 23, a valve seat 25 and a spring 29 acting as a biasing means to force the valve element 23 against valve seat 25. Valve element 23 is rigidly joined to thermostatic element 27. Thermostatic element 27 faces the engine block and is surrounded by coolant liquid which is at the temperature being generated in the liquid by the engine during its operation.

When the temperature of the surrounding coolant liquid is below a predetermined value, valve element 23 is biased against valve seat 25 and prevents any flow between the engine block 16 and radiator 18. When the temperature of the surrounding coolant liquid exceeds the predetermined temperature, thermostatic element 27 forces the valve element 23 against the biasing force of spring 29 thereby opening the valve to allow a continuous flow of coolant liquid therethrough. Such a condition is shown in FIG. 2a. The movement of coolant liquid through the engine block and radiator prevents any overheating of the internal combustion engine. Further details of the operation of thermostat valve 1 is set forth in U.S. Pat. No. 3,153,933.

There are times when thermostatic element 27 fails to operate causing valve element 23 to stick to valve seat 25. Thus, the flow of coolant liquid through the system is stopped. As the temperature of the surrounding liquid on the engine block exceeds a predetermined temperature, damage may result to the engine.

The outlet section of housing 20 includes an externally threaded end section 28 which abuts the upper end portion 30 of the inlet section. The thermostat 1 is held in place between the upper end 30 and the lower end 32 of housing 20. The internally threaded collar 26 effects the connection between the inlet and outlet sections of housing 20 as shown.

Manually operable means generally designated 21 includes a handle 48 connected to one end of shaft 38 extending through the port portion 36 of housing 20. As shown, handle 48 is immediately adjacent the outside of the housing 20. Brace member 42 is rotatably connected to the lower end of shaft 38 inside housing 20. The lower end of brace member 42 is in direct contact with the top of thermostat 1. Upon turning of handle 48, the threads 40 move within the port portion 36 to force brace member 42 downwardly thereby pushing the valve element 23 away from the valve seat 25 to provide a continuous flow of coolant liquid from the inlet port 22 through the outlet port 24.

The embodiment of FIG. 3 discloses a straight housing 45 having an inlet section 47 and an outlet section 49. The support assembly, generally designated 51 is disposed between the first stationary chamber defined by inlet section 47 and the second stationary chamber defined by outlet section 49. Fastening members 52 attach the cover 50 on one side of the housing 45 and includes a port portion 46. Handle 148 is immediately adjacent the outside of the housing 45 and disposed at the end of shaft member 150. The brace member 142 is rotatably connected to the other end of shaft member 150 having a threaded portion 154 internally engaged with the port 46. Brace member 142 acts upon the top of the standard thermostat 1 as in the embodiment of FIG. 1. Hose 12 is connected as above to the fluid inlet port and hose 14 is connected to the fluid outlet port.

A variation of a support assembly made in accordance with this invention includes an adaptor ring 53 disposed between the holding discs 54 and 56 where the thermostat 2 would have a different size rim or flange than the thermostat 1 as in the embodiments of FIGS. 2 and 3.

Figure 5:
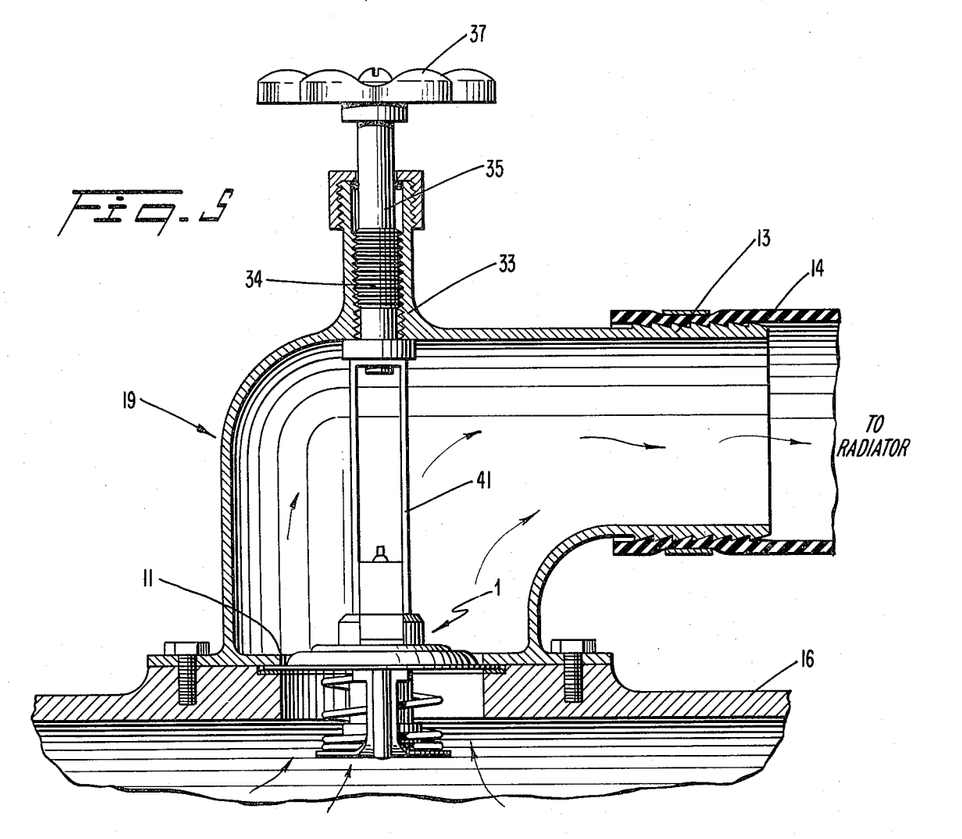
FIG. 5 is a longitudinal sectional view through a third embodiment of a thermostat mounting assembly made in accordance with this invention.

The embodiment of FIG. 5 is disposed contiguously to the motor block 16. Thermostat 1 is held by the frame holding structure 11 at the fluid inlet port. The hose 14 is connected to the fluid outlet port 13. Handle 37 is disposed immediately adjacent the outside surface of housing 19 at the end of shaft member 35. Brace member 41 is rotatably disposed at the inner end of shaft member 35. Upon turning handle 37 clockwise, threaded portion 34 which engages the threads of port portion 33 moves brace member 41 downwardly against the top of thermostat 1 as disclosed in the earlier embodiments.

Figure 6:
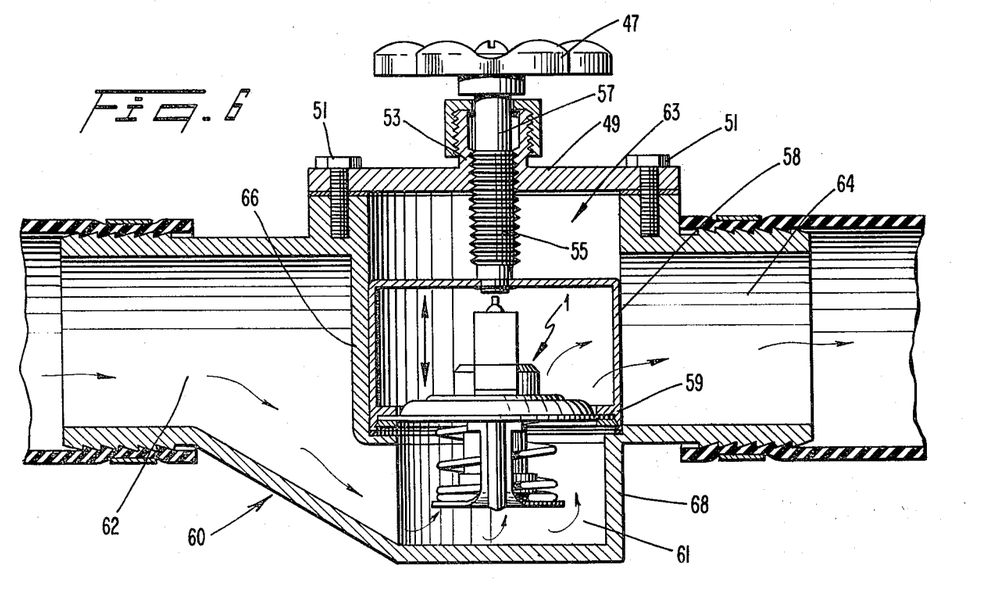
FIG. 6 is a longitudinal sectional view through a fourth embodiment of the invention as disclosed herein.

The housing, generally designated 60 in the embodiment of FIG. 6, includes an inlet section 62 and an outlet section 64 defining first and second stationary chambers, respectively. The carrier section 63 has a structural configuration to rigidly fix the thermostat 1 in place between the inlet section 62 and outlet section 64 which include inlet and outlet ports, respectively. The carrier section includes a brace member 53 rotatably connected to the lower end of the shaft member 57 and to the thermostat frame holding rim 59 in any suitable manner. The carrier section 63 is movably disposed within housing 60 between a closed position and an open by-pass position upon manipulation of the handle 47 mounted at the outer end of shaft member 57.

Fastening elements 51 connect cover 49 to the housing 60. Cover 49 includes an internally threaded port portion 53 which engages threads 55 of shaft member 57. The carrier section 63 is shown in the closed position with the thermostatic element 27 disposed within the housing cavity 61 formed by the wall section 68 of housing 60. Cylindrical wall 66 inside housing 60 defines a tubular section within which the carrier section 63 moves between the closed position and an open by-pass position. When handle 47 is rotated counter-clockwise, the carrier section 63 moves upwardly and away from the cavity 61 thereby simply removing the thermostat 1 away from the opening between the inlet section 62 and the outlet section 64. Thus, movement of carrier section 63 to an open position is effective to establish a continuous flow of coolant fluid between the inlet and outlet ports between the carrier section 63 and the inside of the housing 60 as is clearly evident from the drawings. With the carrier section 63 in the closed position as shown, the flow of coolant liquid is through the thermostat 1 and is the position established during normal operation of the thermostat.

Figure 7:
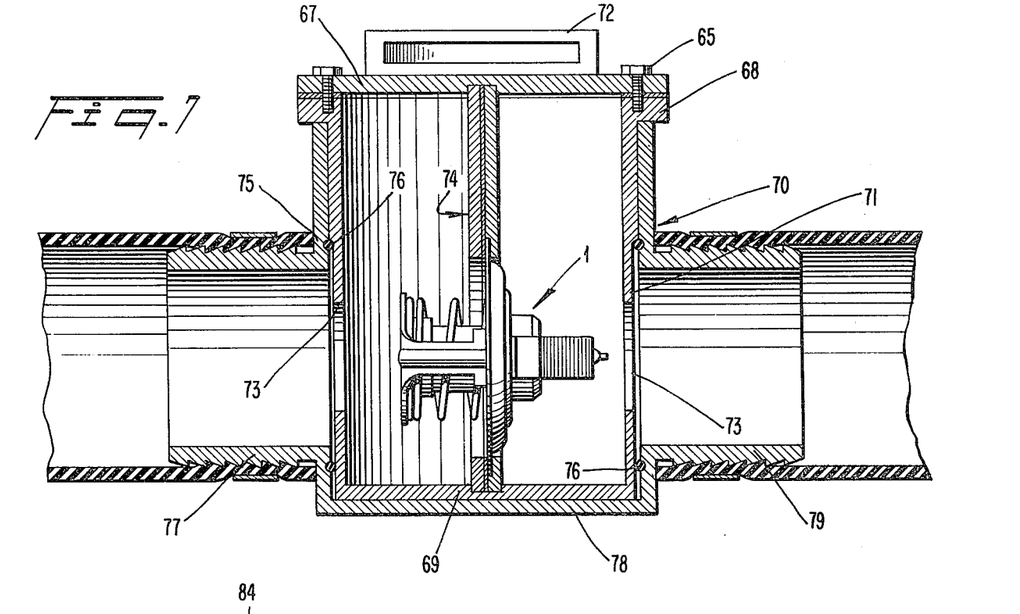
FIG. 7 is a fifth embodiment of a thermostat holding assembly made in accordance with this invention.

The embodiment shown in FIG. 7 includes a housing generally designated 70 having an outer casing including the fluid inlet port 77 and fluid outlet port 79. A tubular section of the outer casing has an open end surface 68, a closed end surface 78 and a tubular sidewall 75.

The carrier section includes a cylindrical shell 71 having a pair of openings 73 located on opposed sides of the thermostat holding frame 74. The cover member 67 is rigidly attached to the thermostat frame holding assembly 74 as shown. Handle 72 is connected to the outside of the cover member 67 which is fixedly attached to cylindrical shell 71 via bolts 65. Shell 71 is rotatably disposed within tubular section 75 with the aid of O-rings 76 disposed therebetween. Thus, cylindrical shell 71 extends outwardly from the open end surface 68 of tubular section 75. The closed bottom 69 of shell 71 is contiguously disposed the closed end surface 78 of housing 70 when the carrier section or shell 71 is located in a first normal operational position as shown in FIG. 7. In this first position, openings 73 are aligned with the inlet and outlet ports 77 and 79 to direct the flow of coolant liquid through the thermostat 1. The cylindrical shell is movable to a second by-pass position once the bolts 65 are removed to allow a turning and outward movement of the shell 71 with respect to housing 70. In the second position, the closed end surface 78 is spaced from the outside of the cylindrical shell 71 along its bottom 69 to direct a continuous flow therebetween around cylindrical shell 71.

Figures 8, 9:
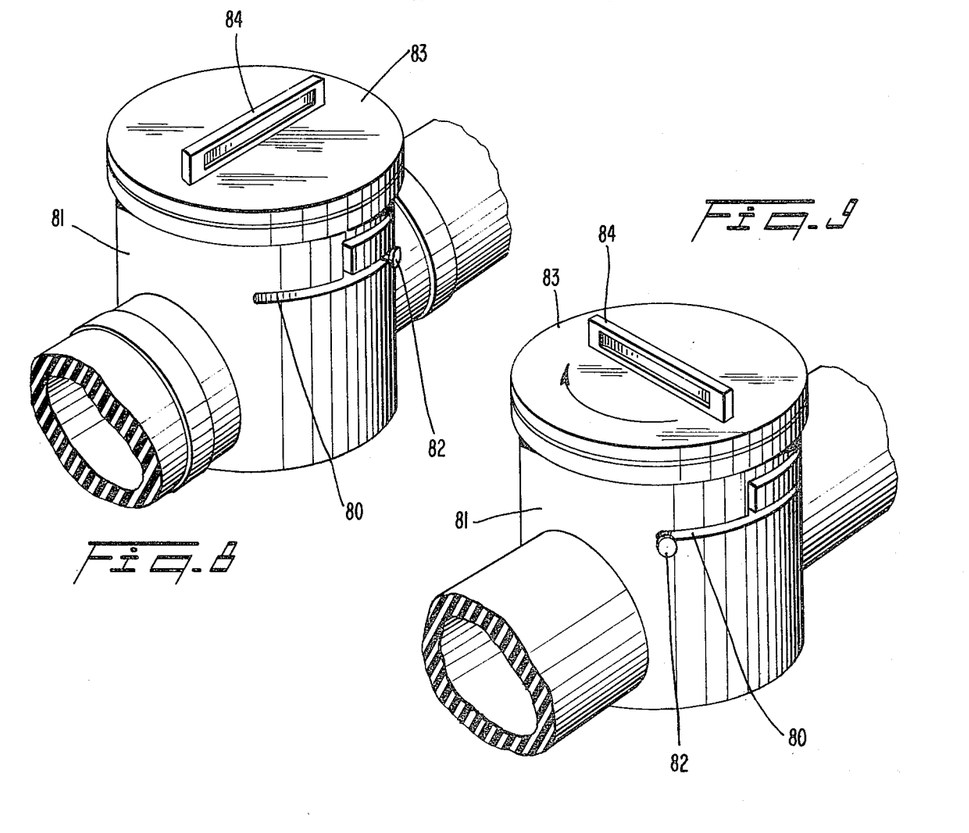
FIGS. 8, 9 and 10 are perspective views of the embodiment as shown in FIG. 7 showing the thermostat mounting assembly in a normal thermostat position, a sealed off position, and a by-pass position, respectively.
Figure 10:
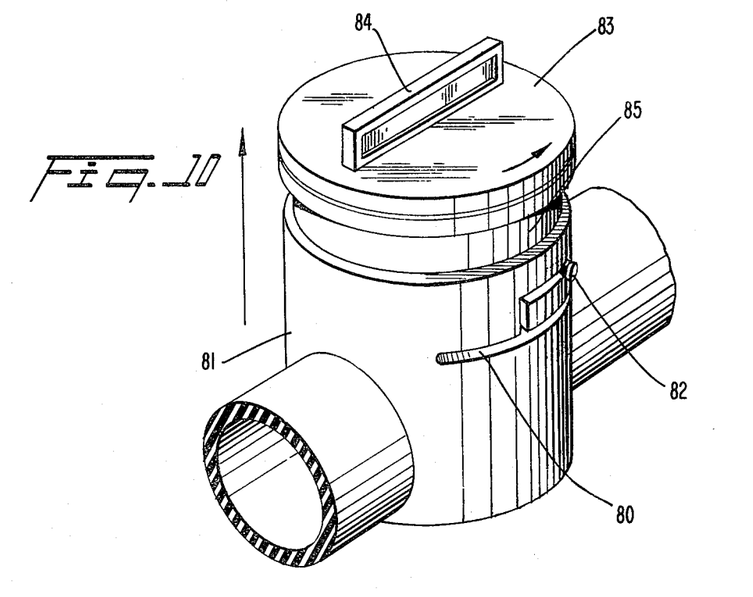

A further embodiment of the type of structure shown in FIG. 7 is shown in FIGS. 8, 9 and 10. In place of the bolts 65, this embodiment incorporates the use of a guiding slot 80 located in a tubular section 81. The inside structure of the cylindrical shell is the same as that shown in FIG. 7. The protrusion or projection element 82 has an enlarged head portion as shown. Handle member 84 is fixedly disposed to cover member 83 which is fixedly attached to a cylindrical shell in any suitable manner.

With the projection 82 shown in FIG. 8, the disposition of thermostat 1 is the same as that shown in the embodiment of FIG. 7 wherein the openings of the inner cylindrical shell are lined to provide a flow through the thermstat and the inlet and outlet ports. With the handle turned as shown in FIG. 9, the longitudinal axis of thermostat 1 is disposed in a direction perpendicular to the direction of flow through the inlet and outlet ports. The sealed off position may be necessary in situations to replace the thermostat 1.

As shown in FIG. 7, the thermostat frame holding assembly 74 is removably disposed in the bottom 69 so that the cover 67 and frame assembly 74 move as a unit out of the cylindrical shell 71. This enables the replacement of the thermostat 1 if necessary. It is also possible that the inside surfaces of the shell 71 would be grooved so that the assembly 74 might be totally separate from the cover 67 and be held in place by a groove completely surrounding the assembly 74 once the cover 67 is held in place by bolts 67.

With regard to the embodiment as shown in FIGS. 8, 9 and 10, the groove 80 may be formed to eliminate the sealed off position and simply move directly from the thermostat position shown in FIG. 8 to the by-pass position shown in FIG. 10. In this latter position, the cylindrical shell 85 is disposed outwardly from the tubular section 81 to allow the formation of a continuous coolant liquid flow between the inside end of cylindrical shell 85 and the closed end surface of the tubular section 81.

Figure 11:
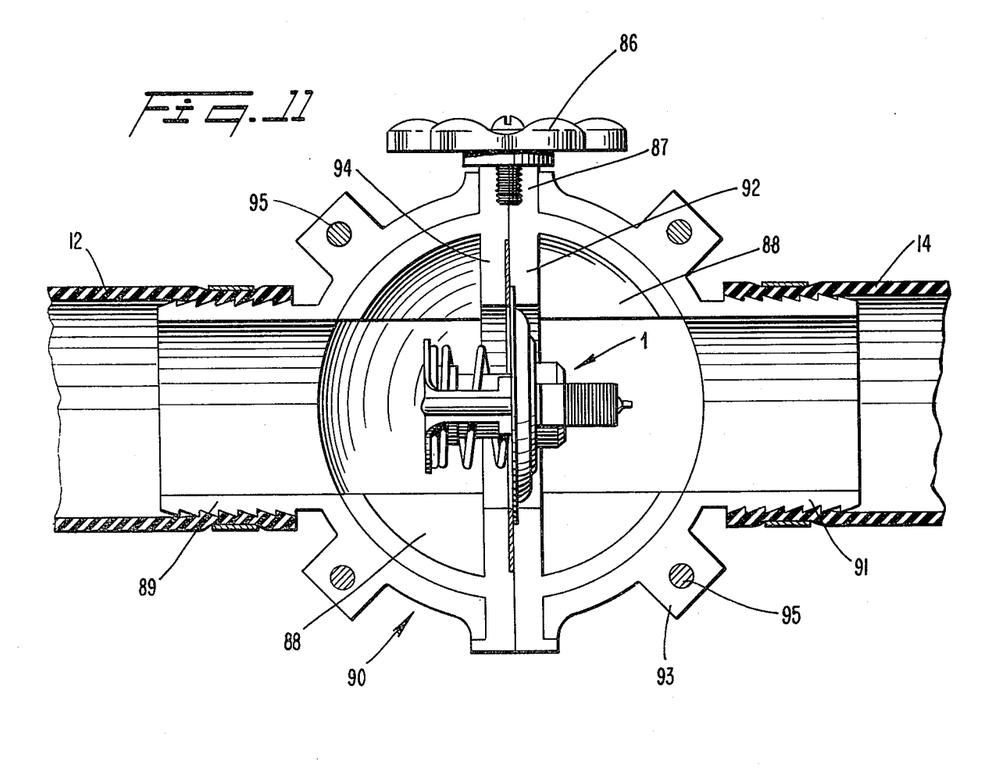
FIG. 11 is a longitudinal sectional view through a sixth embodiment of a thermostat holding assembly made in accordance with this invention.

The embodiment of FIG. 11 has spherical shaped sections 88 in the housing 90 which is defined by two half sections fitted together using the plurality of tabs 93 and bolt members 95. The thermostat 1 is held together by the disposition of two frame elements 92 and 94 which form a shaft member 87 to which the handle 86 is fixedly attached. The elements 92 and 94 are shaped as a circle to fit the inside surface of the sphere formed in the housing 90 when the two housing halves are placed together as discussed. The housing 90 includes a fluid inlet port 89 and a fluid outlet port 91 connected as in the early embodiments to the hoses 12 and 14. The circular wall sections 92 and 94 are disposed in a closed position so that the direction of flow of the coolant liquid is through the thermostat. If for any reason, it is desired to by-pass the thermostat 1, it is simply a matter of turning the handle 86 to thereby rotate the wall segment which holds the thermostat 1 at a 90° angle so that the inlet and outlet ports 89 and 91 are no longer blocked by the divider wall formed by the circular sections 92 and 94 holding the thermostat in place. To change the thermostat, it is necessary to remove the fastening elements 95 to separate the two halves forming the housing 90.

Figure 12:
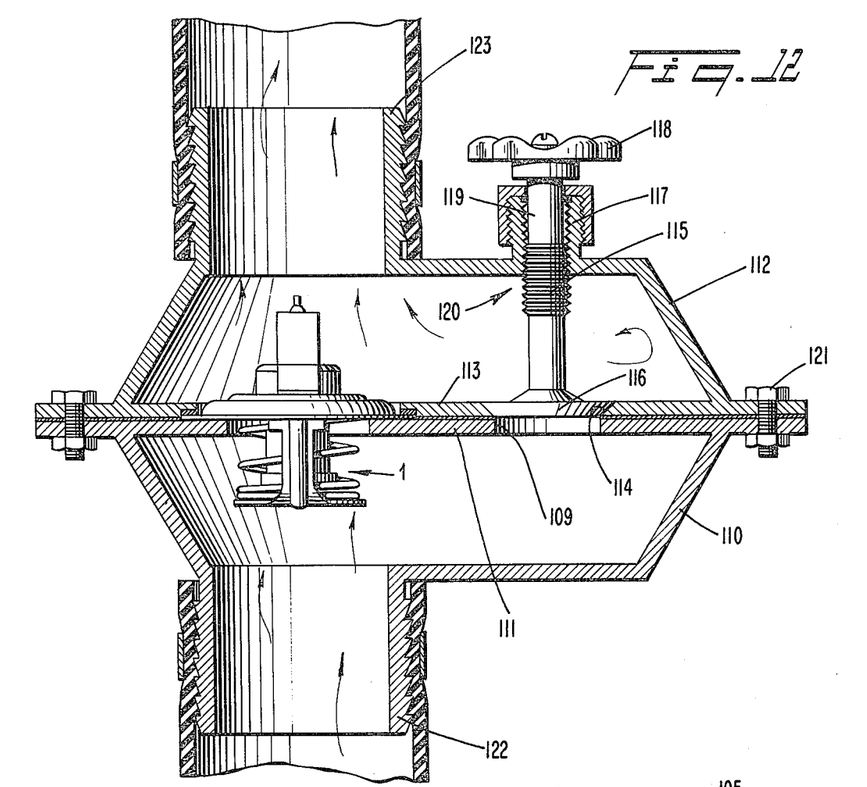
FIG. 12 is a longitudinal sectional view through a seventh embodiment of the invention as disclosed and described herein.

The embodiment of FIG. 12 includes an inlet housing section 110 fixedly connected to an outlet housing section 112 via fastening elements 121. The inlet housing section 110 includes an inner wall 111 juxtaposed inner wall 113 of outlet housing section 112. By-pass opening 109 in wall 111 is aligned with by-pass opening 114 of inner wall 113. Valve assembly, generally designated 120, is disposed on one side of the aligned by-pass openings 109 and 114. Valve assembly 120 includes a plug member 116 disposed at the inner end of a shaft member 119. Threaded portion 115 threadingly engages the inside of the port portion 117 of the outlet housing section 112. Handle 118 fixedly attached to the outer end of shaft 119 immediately adjacent the housing 112, is used to move the plug member 116 into and away from the valve seat formed on the by-pass opening 114.

Under normal operations, the thermostat is maintained in place with the direction of flow being through the fluid inlet port 122, through the thermostat 1 and outwardly through the fluid outlet port 123. If for any reason it is desired to by-pass the thermostat 1, the valve assembly 120 can be manipulated to unplug the openings 109 and 114 to establish a continuous flow of coolant fluid through the embodiment of the thermostat mounting assembly of this invention.

Figure 13:
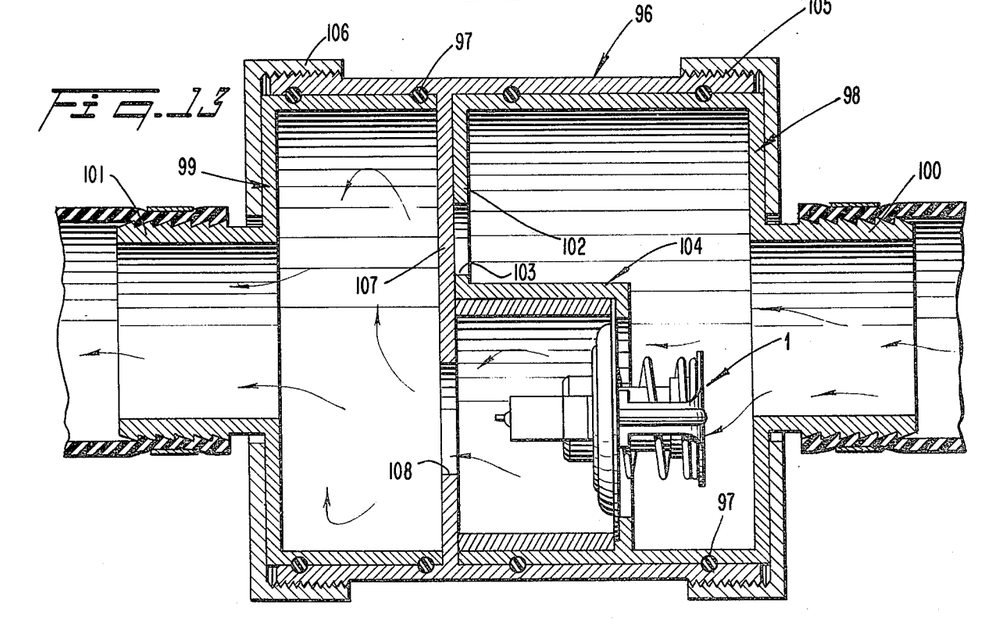
FIG. 13 is a longitudinal sectional view through an eighth embodiment of a thermostat mounting assembly made in accordance with this embodiment.

The embodiment as shown in FIG. 13 includes a fixed inlet section 98 defining a first stationary chamber and having the fluid inlet port 100. An outlet section 99 defines a second stationary chamber and includes the fluid outlet port 101. The housing, generally designated 96, is rotatably mounted about the fixed inlet and outlet sections 98 and 99. Housing 96 rotates freely along the O-rings 97 disposed along the length of the housing as shown. End sections 105 and 106 of the rotatable housing 96 are threadingly engaged to a center section of housing 96 as shown.

A fixed wall member 102 is connected to inlet section 98 and includes a by-pass opening 103. A wall member 107 of housing 96 includes an opening 108 eccentrically disposed with respect to the access of the housing. As shown, the direction of flow is through thermostat 1 which is rigidly held in place in the thermostat frame holding assembly 104. To by-pass the thermostat 1, it is simply necessary to rotate the housing 96 around the outside of the thermostat mounting assembly to align the by-pass openings 103 and 108. Such a disposition of the openings 103 and 108 will establish a continuous coolant liquid flow between the radiator and engine block.

Figure 14:
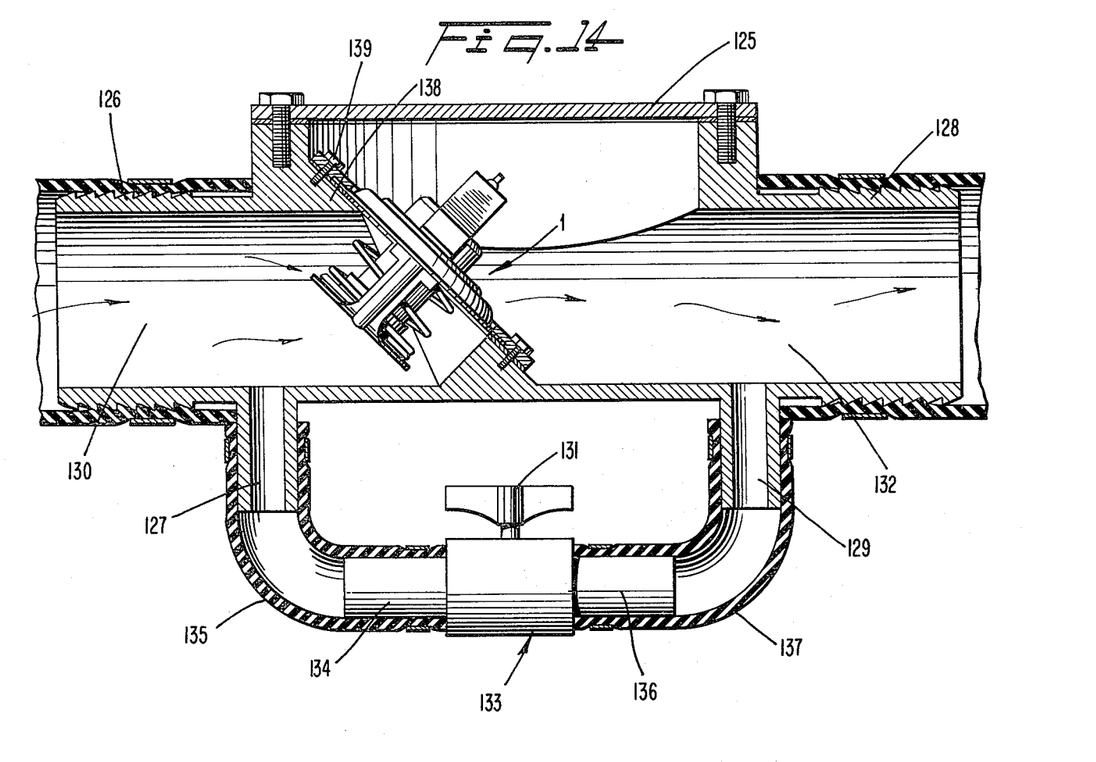
FIG. 14 is a longitudinal sectional view through a ninth embodiment of a thermostat mounting assembly made in accordance with this invention.

The embodiment of FIG. 14 discloses an inlet section 130 having a fluid inlet port 126 and a by-pass opening 127 and defines a stationary chamber on one side of thermostat 1. The outlet section 132 includes the fluid outlet port 128 and by-pass opening 129 while defining a stationary chamber on the other side of the thermostat 1 opposed from the first stationary chamber. The cover 125 may be removed from the one side of the housing outlet section 132 for the purpose of replacing thermostat 1. The frame support assembly 138 provides the base for maintaining the flange of thermostat 1 in place while fixing it rigidly using bolt members 139 as shown.

A valve assembly, generally designated 133, includes an actuating handle 131 for opening and closing the flow of fluid between the valve inlet 134 and valve outlet 136. Hose section 135 connects the by-pass opening 127 to the valve inlet 134. Hose section 137 connects the valve outlet 136 to the by-pass opening 129 as shown. In the event that a continuous flow is to be established between the fluid inlet port 126 and fluid outlet port 128, it is simply a matter of opening the valve assembly 133.

Figure 15:
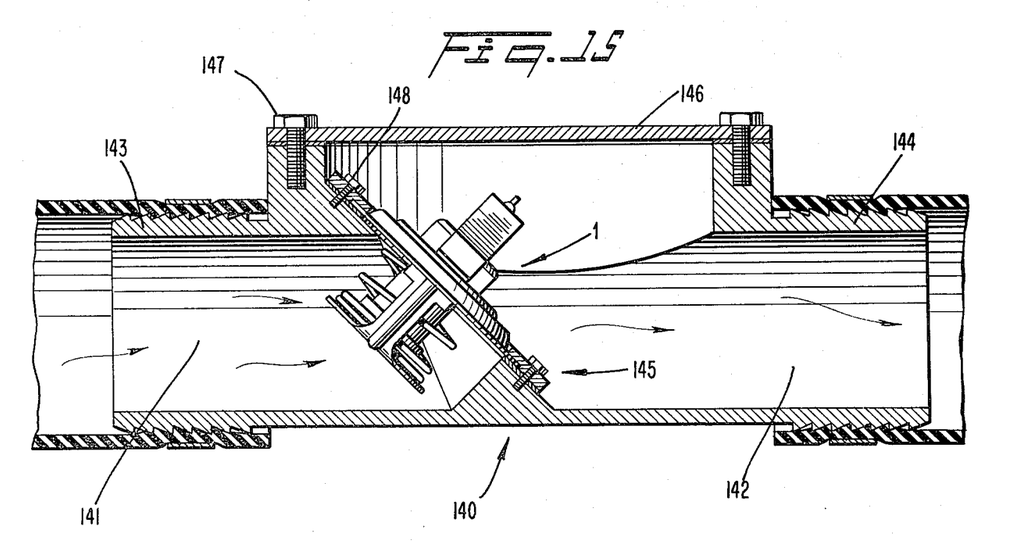
FIG. 15 is a longitudinal sectional view through a tenth embodiment of a thermostat holding assembly made in accordance with this invention.

The embodiment of a thermostat mounting assembly as shown in FIG. 15 includes a housing, generally designated 140, having an inlet section 141 and an outlet section 142. Inlet section 141 includes fluid inlet port 143 and defines a first stationary chamber. The outlet section 142 includes the fluid outlet port 144 and defines a second stationary chamber. Support means 145 located between the first and second stationary chambers rigidly fixes the thermostat 1 in place within the housing 140. A removable cover member 146 is disposed over an opening located on one side of the housing 140 thereby providing a wall section over the opening in the outlet section 142. The opening covered by the cover member 146 has a size effectively large to manually remove and install thermostat 1 on the support assembly 145. Thus, if it is desired to form or establish a continuous flow of coolant fluid, it is simply a matter of removing the bolt members 147 and 148 to completely remove the thermostat 1 from the thermostat mounting assembly. Once the cover member 146 is replaced on the housing 140 without the thermostat on the mounting assembly 145, a continuous flow of coolant liquid can then be established between the engine block and radiator of an internal combustion system. As has been disclosed and described herein, the thermostat mounting assembly of this invention provides many advantages to the vehicle operator. Any thermostat needing to be replaced may be done so by anyone able to remove a bolt or turn a handle. No skilled training is required to effect the replacement of a thermostat or to by-pass the thermostat which is normally placed at a very inconvenient location in the engine block. Furthermore, the thermostat mounting assembly of this invention is usable with every standard thermostat now being used on internal combustion engines. A simple hand manipulation will provide a full, continuous flow of cooling lubricant in the event of thermostat failure or where it is desired to have such a continuous flow when the vehicle is under heavy load such as when towing a vehicle or when climbing large inclines such as in mountainous areas.

While the thermostat mounting assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An apparatus for establishing a continuous flow of a coolant liquid to bypass a standard thermostat located between an engine block and a radiator wherein the thermostat includes a thermostatic element, a valve element, a valve seat and a spring acting as a biasing means to force the valve element against the valve seat, said apparatus comprising:
    (a) a housing having only a fluid inlet port and a fluid outlet port with said inlet and outlet ports having a structural configuration for coupling to a radiator hose,
    (b) support means located between the inlet and outlet ports in said housing for rigidly fixing the thermostat, within said housing, and
    (c) manually operable means connected to said housing to effect a continuous flow of the coolant liquid bypassing the thermostat between the engine block and the radiator,
    (d) said manually operable means includes direct engagement means to force the movable valve element of the standard thermostat from a closed position in which the valve element fails to open on normal operation to an open position which allows a continuous flow of coolant liquid to pass,
    (e) the manually operable means includes handle means mounted on one external end of a rigid shaft member extending through the housing with the other end of the shaft member being inside the housing,
    (f) said engagement means includes brace means mounted to the inside end of the shaft member and having a structural configuration to contact said movable valve element.

2. An apparatus as defined in claim 1 wherein
said housing has an internally threaded port portion,
    the shaft member threadingly engages the threaded port portion, and
    the brace means is rotatably mounted to the end of the shaft member and linearly moves to force the valve element of the thermostat disposed on the support means to said open position.

3. An apparatus as defined in claim 1 wherein
said housing has an inlet section coupled to an outlet section,
    one end of the inlet section abuts with an end of said outlet section to hold said thermostat therebetween.

4. An apparatus as defined in claim 2 wherein
said housing has an outlet section and an inlet section,
    said outlet section includes said threaded port portion and the fluid outlet port and said inlet section includes said fluid inlet port,
    the outlet and inlet sections are joined with externally manipulatable fastening means.

5. An apparatus as defined in claim 1 wherein
the brace means includes a U-shaped element contacting the movable valve element of the thermostat to move the valve element away from the valve seat when the shaft member is rotated.

6. An apparatus as defined in claim 1 wherein
said housing has an internally threaded port portion,
    the shaft member threadingly engages the threaded port portion and has a delimited length with the external end bearing the handle means being located immediately adjacent the threaded port portion.

7. An apparatus as defined in claim 1 wherein
said housing includes an inlet section having said fluid inlet port and an outlet section having said fluid outlet port,
    said inlet section defining a first stationary chamber and said outlet section defining a second stationary chamber,
    said support means being located between the first and second stationary chambers for rigidly fixing said thermostat in place within said housing,
    removable cover means being disposed over an opening on one side of the housing to provide a wall section over said opening for one of said inlet or outlet sections,
    said opening having a size effectively large to manually remove and install a thermostat on said support means.

8. An apparatus as defined in claim 7 wherein said cover has an internally threaded port portion, the shaft member threadingly engages the threaded port portion, and the brace means is rotatably mounted to the end of the shaft member and linearly moves to force the valve element of the thermostat disposed on the support means to said open position.

9. An apparatus for establishing a continuous flow of a coolant liquid to bypass a thermostat located between an engine block and a radiator wherein the thermostat includes a thermostatic element, a valve element, a valve seat and a spring acting as a biasing means to force the valve element against the valve seat, said apparatus comprising:

(a) a housing having only a fluid inlet port and a fluid outlet port with said inlet and outlet ports having a structural configuration for coupling to a radiator hose, (b) support means located between the inlet and outlet ports in said housing for rigidly fixing the thermostat within said housing, (c) direct engagement means located within said housing to force the valve element of the thermostat from a closed position in which the valve element fails to open on normal operation to an open position which allows a continuous flow of coolant liquid to pass, and (d) handle means mounted immediately externally of said housing and connected to the direct engagement means for effecting a continuous flow of coolant liquid to pass from the fluid inlet port to the fluid outlet port.

* * * * *